United States Patent [19]

Wittwer

[11] 4,260,996

[45] Apr. 7, 1981

[54] ASPIRATED INK JET PRINTER HEAD

[75] Inventor: Alvin L. Wittwer, Paris, Ky.

[73] Assignee: International Business Machines Corporation, Armonk, N.Y.

[21] Appl. No.: 32,424

[22] Filed: Apr. 23, 1979

[51] Int. Cl.³ .................... G01D 15/18

[52] U.S. Cl. .................... 346/75

[58] Field of Search .................... 346/75, 140 R

[56] References Cited

U.S. PATENT DOCUMENTS

| | | | |
|---|---|---|---|
| 4,097,872 | 6/1978 | Giordano | 346/75 |
| 4,160,982 | 7/1979 | Keur | 346/75 |

OTHER PUBLICATIONS

Krause, K. A., Ink Jet Head, IBM Tech. Disc. Bulletin, vol. 19, No. 8, Jan. 1977, pp. 3216–3217.

*Primary Examiner*—Joseph W. Hartary
*Attorney, Agent, or Firm*—William J. Dick

[57] ABSTRACT

Disclosed is an ink jet printer head employing an ink droplet aspirator which includes a housing having a tunnel therein spaced from an ink jet nozzle which emits a stream of ink droplets which pass through the tunnel. A gas stream is also directed through the tunnel at substantially the same velocity as the ink stream. While the upper and lower walls of the aspirator tunnel are formed of sintered metal thereby forming the deflection electrodes, the sidewalls of the tunnel are formed of a dielectric material and are made movable, for example by collapsing toward and away from the tunnel top and bottom walls (deflection electrodes) so as to inhibit sidewall contamination during start up and shut down of the ink stream.

5 Claims, 2 Drawing Figures

ASPIRATED INK JET PRINTER HEAD

SUMMARY OF THE INVENTION AND STATE OF THE PRIOR ART

The present invention relates to ink jet printers, and more particularly relates to an aspirator for an ink jet printer in which the sidewalls of the tunnel of the aspirator are displaceable so as to inhibit ink contamination thereof during start up and shut down of the printer.

In U.S. Pat. No. 4,097,872, issued on June 27, 1978 to Giordano et al is described an aspirator for an ink jet printer of the Sweet type. One of the principle purposes of the aspirator is to provide a gas stream through the tunnel co-extensively with the ink droplet stream and at substantially the same velocity so as to reduce the aerodynamic effects on adjacent ink droplets. In the scheme illustrated in the '872 patent, the tunnels cross-sectional area is substantially constant from one plane to the next when measured in any given plane transverse to the longitudinal axis. In this manner, the velocity of the gas stream remains essentially constant. Conventionally, when starting up a printer of the aforementioned type, and when shutting the printer down, ink drop contamination of the sidewalls of the aspirator may occur. (This is particularly true on cold starts). The sintered metal deflection electrodes or plates (which form the top and bottom walls of the tunnel) have the capacity for absorbing small quantities of ink which fall within the aspirator stream stream start up or shut down, but the dielectric sidewalls of the tunnel do not.

Accordingly, by making the walls or sidewalls of the tunnel of the aspirator collapseable or movable away from the deflection electrodes during printer start up (or shut down) and then closing the walls against the confronting surfaces of the deflection plates after start up, the aspirator tunnel or chamber may be formed subsequent to machine start up. In this manner, with the sidewalls withdrawn during start up, any stray contaminating ink may be disposed inside the cavity adjacent the sidewalls as opposed to being disposed on the sidewalls.

In view of the above, it is a principle object of the present invention to provide movable sidewalls in the tunnel or chamber portion of the aspirator of an ink jet printer.

Other objects and a more complete understanding of the invention may be had by referring to the following specification and claims taken in conjunction with the accompanying drawings in which:

DESCRIPTION OF THE DRAWINGS

Turning now to the drawings, and especially FIG. 1 thereof, as disclosed in U.S. Pat. No. 4,097,872, which is an improvement in a continuous or Sweet type ink jet printing system such as disclosed in U.S. Pat. No. 3,596,275 to Sweet, an aspirator is provided for an ink jet system in which the aspirator includes a tunnel having a substantially uniform cross-sectional area so as to maintain the velocity of the air flow therethrough equal to the ink droplet velocity so that aerodynamic drag on the droplets is substantially eliminated. As illustrated in FIG. 1, an ink jet printer head 10, in the present instance for an analog deflection system, includes a drop generator portion 11 and an aspirator assembly 20 constructed in accordance with the present invention. As is well known, the drop generator portion 11 of an analog deflected or continuous type ink jet system includes a chamber therein for housing a supply of ink which is perturbated as by a piezoelectric crystal, to provide a stream of ink droplets from a nozzle 12. The ink stream, due to the perturbations of the ink supply, breaks up into ink drops 13 which then receive a charge within a charge electrode 14. The charged ink drops pass between upper and lower deflection electrodes 21 and 22 respectively mounted within the aspirator assembly 20 which effect deflection of the ink drops in accordance with the charge thereon. If the drops are uncharged, (and in the event character printing is not desired) they engage a gutter 15 which recirculates the ink back to an ink supply pump (not shown) and ultimately back to the drop generator 11.

Figure 1:
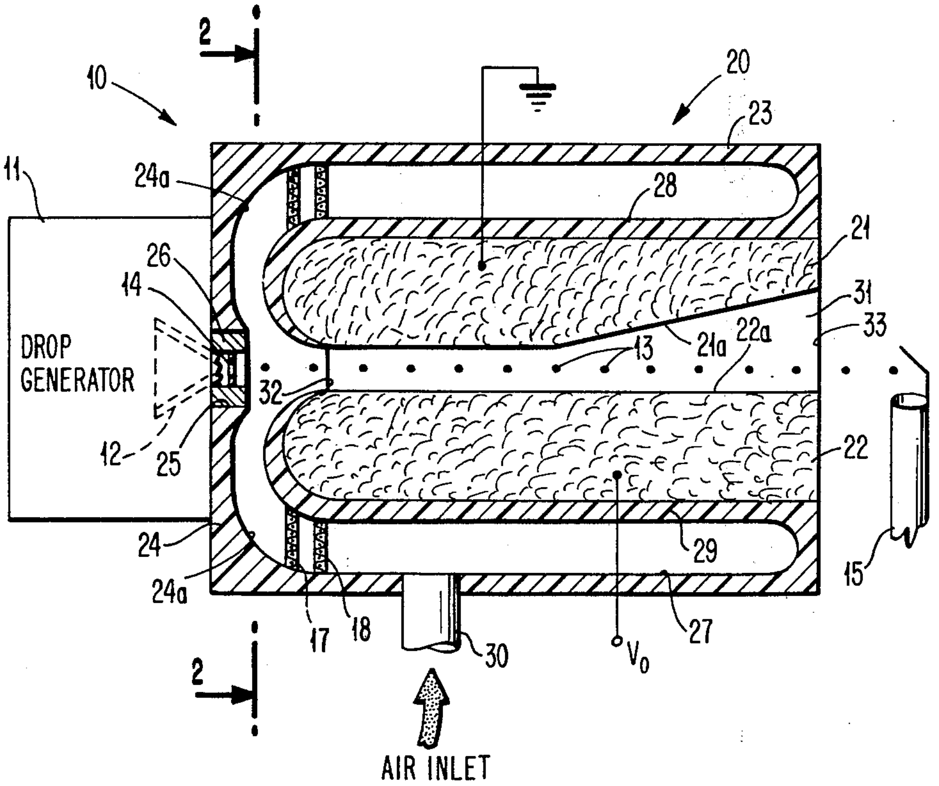
FIG. 1 is a fragmentary, sectional, enlarged side elevational view of a portion of an aspirated ink jet printer embodying subject matter constructed in accordance with the present invention.

The aspirator assembly 20 includes a housing 23 which is tubular, and in the illustrated instance cylindrical. The housing is composed of a dielectric material, for example a ceramic or a plexiglass, or a plastic such as NORYL (trademark of General Electric). The housing includes a first end wall 24 having, in the present instance, a central aperture 25 therein, which may be coupled to means 26 incorporating the charge electrode 14. Moreover, the wall 24 may serve, in any convenient manner, to couple the housing 23 to the drop generator 11. One such method of coupling is illustrated in U.S. Pat. No. 4,097,872, but it should be emphasized that any convenient coupling which does not introduce turbulance to the air flow through the aspirator or permit air leakage, may be employed.

The housing 23 includes a cavity 27 therein which is annular in configuration due to the axially extending continuation 28 and 29 which capture respectively the upper and lower deflection electrodes 21 and 22. The end walls 28*a*, 29*a* are preferably smoothly curved as is the interior 24*a* of the wall 24 of the housing 23 so as to provide a smooth non-turbulant path for aspirator air flow entering an air inlet 30. Thus the deflection electrodes 21 and 22 are disposed in the cavity 27 but are spaced apart to form at least one pair of spaced apart confronting surface areas for forming a first pair of sidewalls 21*a*, 22*a* of a chamber or tunnel 31 within the cavity 27. Moreover, while the longitudinally extending sides of each of the deflection electrodes may be of any convenient shape, the enlarged bulbous portion 21*b*, 21*b* which smoothly converge into narrower necked down portions 21*c*, 22*c* merging into the surfaces 21*a*, 22*a* respectively, are preferred. (See FIG. 2).

In accordance with the invention, while the sintered metal deflection electrodes 21 and 22 have the capacity for absorbing small quantities of ink which fall within the chamber or tunnel 31 during stream start up or shut down, the second pair of sidewalls confronting the electrodes 21 and 22 of the chamber 31 must be composed of a dielectric material and are preferably movable between a recessed position in the cavity 27 and spaced from the confronting surfaces 21*a*, 22*a* of the electrode and into a second position against the confronting surfaces to thereby form the chamber.

Figure 2:
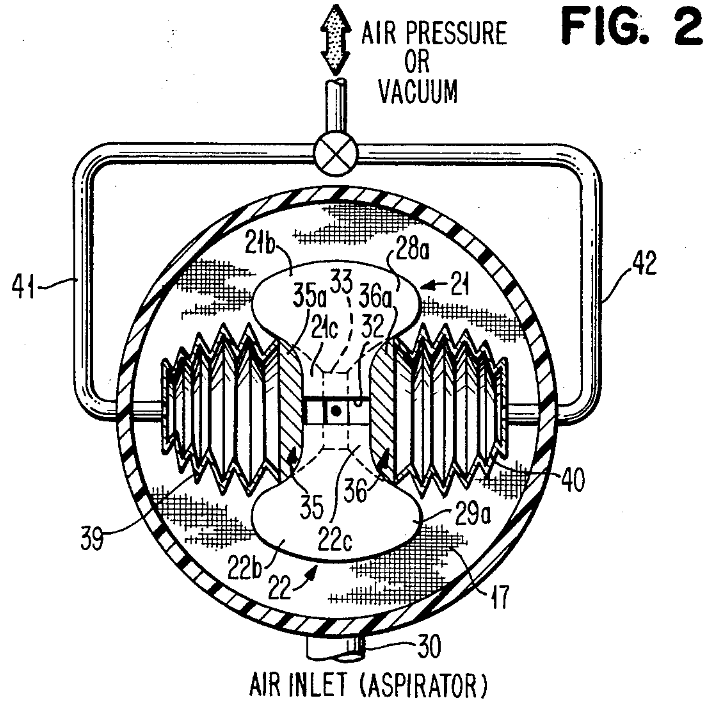
FIG. 2 is a fragmentary sectional view taken along line 2—2 of FIG. 1 and as if portions of the filter screens were transparent.

As illustrated best in FIG. 1, the tunnel 31 includes an entry opening 32 which, as illustrated in FIG. 2, is generally rectangular with a longer horizontal extent than vertical extent, while the outlet opening 33 of the tunnel 31 is just the opposite, that is with the vertical extent larger than the horizontal extent. In this manner, the cross-sectional area of the chamber at any point is substantially equal to the cross-sectional area of the chamber at any other point. Moreover, the sidewalls 35 and 36 which are disposed in the cavity are movable, in a manner to be described hereinafter, between a position such as shown in FIG. 2 against the sidewalls of the deflection electrodes 21 and 22 and more particularly against the edges of the confronting surfaces 21*a*, 22*a* so as to seal the sides of an form the tunnel 31, and to another position apart from the confronting surfaces.

The sidewalls 35 and 36 are preferably composed of a stiffened but resilient material which are a dielectric, for example a delrin or other plastic material which is reinforced to form the thickened sections such as illustrated at 36*a*, 35*a*. Rearwardly of each of the sidewalls 35 and 36 is a bellows like collapsable support 39, 40 for the sidewalls 35 and 36 which permits the sidewalls, upon the application of suitable vacuum as through piping 41, 42 to withdraw the sidewalls from their confronting relationship with the electrodes 21 and 22 or at least the confronting surfaces 21*a*, 22*a* so that upon start up or shut down of the system, ink in the form of misdirected drops will not impinge upon the sidewalls. In this manner contamination of the sidewalls as well as the risk of short circuits due to ink streaking on the sidewalls is inhibited.

After start up of the stream, by applying air pressure to the bellows like structures 39 and 40 through piping 41 and 42, the bellows 39 and 40 expand, and due to the smoothly converging curves of the side profiles of the deflection electrodes 21 and 22 from the bulbous portions 21*b*, 22*b* to the necked down portions 21*c*, 22*c*, the flexible reinforced sidewalls 35 and 36 conform easily to that outline sealing the edges of the electrodes 21, 22 and forming the sidewalls 35 and 36 of the tunnel 31. Thus the side profile of the deflection electrodes serves as guide means for the sidewalls 35 and 36, compensating automatically for any misalignment or faulty registration due to retraction of the sidewalls.

Preferably the piping 41 and 42 enters the cavity 27 in such a place as to inhibit the creation of turbulance of air entry into the air inlet 30 that is associated with the aspirator air flowing through the tunnel like chamber 31. Moreover, it should be recognized that air smoothing screens or filters such as the filters 17 and 18 may be employed to reduce turbulance and create, as closely as possible, laminar air flow through the tunnel 31.

Thus the apparatus of the present invention permits of withdrawal and reapplication of the sidewalls of the tunnel like chamber through which the ink stream and air stream of the aspirator pass so that upon start up and shut down of the aspirator ink contamination is inhibited.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. In a continuous stream ink jet printer including a nozzle for emitting a continuous stream of ink drops, a charge electrode adjacent said nozzle for charging ink drops, and charge deflection electrodes adjacent said charge electrode for deflecting charged ink drops in accordance with the charge thereon, the improvement comprising; a tubular housing including a cavity therein; said deflection electrodes being disposed in said cavity and including at least one pair of spaced apart confronting surfaces forming a first pair of sidewalls for a tunnel within said cavity and between said surfaces; a second pair of sidewalls composed of a dielectric material and disposed in said cavity, each of said second pair of sidewalls including a thickened portion merging into a support, and means connected to said support for effecting movement of said thickened portions between a recessed position in said cavity spaced from said confronting surfaces and into another position against said confronting surfaces thereby forming said tunnel.

2. In a continuous stream ink jet printer in accordance with claim 1 wherein said support includes means responsive to fluid pressure for effecting said movement.

3. In a continuous stream ink jet printer in accordance with claim 2 wherein said means responsive to fluid pressure comprises a bellows.

4. In a continuous stream ink jet printer in accordance with claim 2 including guide means in said cavity for guiding said thickened portion into sealing engagement against said first pair of sidewalls.

5. In a continuous stream ink jet printer in accordance with claim 4 wherein said guide means are formed by a side profile of said deflection electrodes.

* * * * *